(12) United States Patent
Abramsohn

(10) Patent No.: US 6,369,842 B1
(45) Date of Patent: Apr. 9, 2002

(54) PERMANENT PHOTORECEPTOR REGISTRATION MARKING AND METHOD

(75) Inventor: Dennis A. Abramsohn, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/687,108

(22) Filed: Oct. 16, 2000

(51) Int. Cl.[7] .............................................. G03G 15/01
(52) U.S. Cl. ........................ 347/116; 399/162; 430/127
(58) Field of Search .......................... 347/116; 399/162, 399/301, 78; 430/69, 127; 178/62

(56) References Cited

U.S. PATENT DOCUMENTS

| | | | |
|---|---|---|---|
| 3,935,333 A | * | 1/1976 | Muneoka et al. ......... 178/62 X |
| 4,780,385 A | | 10/1988 | Wieloch et al. ............... 430/58 |
| 4,912,491 A | | 3/1990 | Hoshino et al. ............. 346/160 |
| 5,302,973 A | * | 4/1994 | Costanza et al. ...... 347/116 XE |

* cited by examiner

Primary Examiner—Joan Pendegrass (57) ABSTRACT

Xerographic printers may be provided with a photoreceptor belt manufactured so that transparent permanent optical registration marks are formed in defined selected minor areas of the belt without physically weakening the belt, as is the case with belt holes. These permanent registration marks are sufficiently transparent for a conventional belt holes sensor to optically detect them by illumination through those transparent areas of the photoreceptor. The photoreceptor is preferably a plural layer organic photoreceptor with an internal optically opaque metallic ground plane layer, and the optical registration marks are formed by oxidizing defined areas thereof. This may be accomplished by the simultaneous selective application of illumination to these selected minor areas of the photoreceptor, while adjacent areas of the photoreceptor are not illuminated, plus the application of electrical current from a voltage source applied through the belt in those areas.

8 Claims, 4 Drawing Sheets

PERMANENT PHOTORECEPTOR REGISTRATION MARKING AND METHOD

Cross-reference is made to a commonly assigned co-pending U.S. application Ser. No. 09/692,236, filed Oct. 20, 2000 by Martin E. Hoover et al, entitled "Two Dimensional Surface Motion Sensing System Using Registration Marks and Linear Array Sensor".

Disclosed is an improvement in permanent registration markings for the accurate registration of an image bearing member of an image reproduction system, in particular, the photoreceptor of a xerographic reproduction apparatus, such as a plural color printer. A method is disclosed for forming permanent registration (fiducial) marks in desired areas of a photoreceptor belt, by making those areas transparent, and thus readily optically detectable relative to other belt areas, without requiring apertures or other physical impairment of the photoreceptor belt.

The photoreceptor belt permanent registration marking system and method of manufacture disclosed in the specific embodiment herein can be accomplished with low manufacturing cost and complexity, yet provide accurately optically detectable belt position signals with available optical sensors, by providing sharply and distinctly produced transparent areas in an otherwise opaque photoreceptor belt. It does not require composition or manufacturing changes in existing photoreceptor materials or the belts made therefrom. In particular, it can provides precise belt positional signals, or ROS raster positional signals relative to the belt position, without weakening or damaging the belt or reducing its effective life, unlike belt holes or apertures previously provided for those functions.

The disclosed method may be utilized for making transparent areas in different types of photoreceptors, although it may be more suitable for some than others, as will be apparent to those skilled in that art. For example, the photoreceptor with a metallic ground plane layer of Xerox Corp. U.S. Pat. No. 4,780,385 issued to Fran Weiloch et al, and other art cited therein.

By way of background, belt holes or slots through photoreceptor belts desirably allow light transmissive optical detection, but have problems. They can cause increased stress and wear, or even belt tearing, in the areas of the belt holes or slots. Especially since typical photoreceptor (PR) belts in xerographic copiers and printers must flex and partially rotate around relatively small diameter driving and supporting rollers for many tens of thousands of cycles of use as imaging substrates.

Thus, the need for non-destructive permanent marks on photoreceptor belts is well known and long-standing. Holes are usually cut through the entire belt, near the belt edges, making belt areas that are weak and subject to damage. Yet, this is commonly done, in order to provide for the belt motion and the position of belt imaging panels to be determined with such marks by various sensing means. The (normally opaque) belt can be illuminated from one side, and when a hole or other cut in the belt passes by the illuminator, a optical sensor on the other side of the belt conventionally senses the change in light level through the hole and provides an electrical signal. That electrical signal can indicate, for example, the belt position for the intended start of an image panel, or the presence of a non-imagable seam in the belt which must be tracked so that it does not appear in any image panel. Further, in order to monitor and correct for belt motion anomalies, which cause image artifacts, marks which are alternately opaque and transmissive have also been cut or laser burned into the belt outside the image areas, such as near the belt edge, so that specific positions on the belt can be tracked as the belt moves. In such cases the belt is being physically cut or abraded to provide these belt marks, so the belt becomes physically weaker at these marker areas. Many belt failures are thus caused by belt hole tearing.

Further, the belt hole is normally cut into the ground strip along the belt edge to avoid cuts in the basic photoreceptor area, which can delaminate quickly. However, in typical xerographic machines a ground brush must make continuous contact with that ground strip along the back of the belt, and therefore may ride over this belt hole in every cycle, leading to failures in both sensing and continuous grounding. This has required in some cases the use of two contact brushes, so that one is always in contact with the ground strip, and/or cutting less holes, since they are so troublesome.

Permanent registration marks printed or painted on the belt surface avoid such hole problems, but can wear, and may not provide sufficient optical contrast. If the marks are printed on the imaged side of the belt, which may often be desirable for other reasons, wear can be caused by abrasion from the xerographic cleaning and development systems, or, the belt marks may become contaminated with toner. Yet printed belt marks must depend on light reflective contrast levels different from the adjacent unmarked areas of the photoreceptor, rather than light transmissive detection systems. For that and other reasons they may not provide sufficiently sharp-edged light reflectance mark detections for sufficiently accurate registration.

The system and method disclosed herein can provide the same registration functions as belt holes, or other functions. For example, labeling, timing, and/or registering of images on photoreceptor belts, and/or belt seam skipping. However, the present system does not require belt holes. It provides such sensing cursor functions by providing transparent areas in the belt instead. The present system creates permanent fiducial markings in the belt which are not on the surface and thus not subject to being worn off in use. That is, creating internal selected images of desired fiducial markings which are transparent areas through which light can be transmitted through the belt for light transmissive detection systems.

The system of the embodiment herein can thus, if desired, utilize the same or pre-existing registration sensors and controls designed or used for belt hole registration marks, or other conventional or simple light transmissive detection systems.

To summarize, with the disclosed embodiment and method of making transparent registration marks in the photoreceptor belt, the marks can last as long as the belt lasts mechanically in the machine, since there is no required physical cutting or abrading of the belt. Further, if the marks are made outside of the basic image areas of the belt, the marks can last throughout the entire electrical life of the belt, and the area around it will not change its contrast level. As noted, these marks can easily be used in place of belt holes with current belt registration systems and sensors, compatibly with those systems and sensors, yet prevent belt hole caused belt failures and ground strip contact failures.

An additional possible utility of the disclosed method could be to produce photoreceptors with permanent small "watermark" images therein. If produced in image areas, those images could even produce copies in which those images are negatively reproduced on the final copy substrates, so as to identify the photoreceptor on which they were printed. By way of further background, in various reproduction systems, including xerographic printing, the control and registration of the position of imagable surfaces such as photoreceptor belts, and/or images being placed thereon, is critical, and a well developed art, as shown by exemplary patents cited below. It is well know to provide various single and/or dual axes control systems, for adjusting or correcting the lateral position and/or process position or timing of a photoreceptor belt or other image bearing member of a reproduction apparatus, such as by belt lateral steering systems and/or belt drive motor controls, and/or adjusting or correcting the lateral position and/or process position or timing of the placing of images on the belt with adjustable image generators such as laser beam or raster scanners.

The following exemplary U.S. patents are noted for discussions of photoreceptor or intermediate belt motion sensing with permanent belt fiducial or registration (and/or belt seam location) markings, by belt holes or other apertures, and optical sensors and/or belt steering controls: U.S. Pat. Nos. 4,837,636; 5,175,570; 5,204,620; 5,208,633; 5,248,027; 5,278,587 (on plural ROS beam sweep detections for single pass registered color printing) U.S. Pat. No. 5,383,014; and pending Xerox Corp. Ser. No. 09/450,375, filed Nov. 29, 1999 by Castelli, et al.

Of particular interest to the present application, Canon U.S. Pat. No. 4,912,491, priority-filed May 30, 1987 and issued Mar. 27, 1990 to O. Hoshino, et al, appears to teach some form of permanent transparent areas of an intermediate image transfer belt (not a photoreceptor) for providing optically sensed registration marks, in a ROS raster imaged tandem (plural print engines) printer, for superposing plural xerographic color images with registration. Of course, the composition of intermediate transfer belts is not the same as, and is usually much simpler than, photoreceptor belts.

One important application of such accurate registration systems is to accurately control the positions of different colors being printed on the same intermediate or final image substrate, to insure the positional accuracy (adjacency and/or overlapping) of the various colors being printed. That is, to improve the registration accuracy of such plural color images relative to one another and to the image bearing member, so that the different color images may be correctly precisely positioned relative to one another and/or superposed and combined for a composite or full color image, to provide for customer-acceptable color printing on a final image substrate such as a sheet of paper. The individual primary color images to be combined for a mixed or full color image are often referred to as the color separations.

It is known that permanent belt registration marks may be combined with, as part of, known systems to adjust the registration of the images on either or both axes (the lateral axis and/or the process direction axis) relative to the image bearing surface and one another by adjusting the position or timing of the images being formed on the image bearing surface. That may be done by control of ROS (raster output scanner) laser beams or other known latent or visible image forming systems.

In particular, it is known to provide such imaging registration systems by means of marks-on-belt (MOB) systems, in which edge areas of the image bearing belt laterally outside of its normal imaging area are marked with registration positional marks, detectable by an optical sensor. As noted above, for belt steering and motion registration systems (previously described) such registration marks can be permanent, such as by silk screen printing or otherwise permanent marks on the belt, such as belt apertures, which may be readily optically detectable. However, for image position control relative to other images on the belt, or the belt position, especially for color printing, typically there are also image position registration marks which are not permanent marks. Typically they are marks imaged with, and adjacent to, the respective image, and developed with the same toner or other developer material as is being used to develop the associated image, in axial alignment positions corresponding to, but outside of, the image position. Such marks-on-belt image position or registration indicia are thus typically repeatedly developed and erased in each rotation of the photoreceptor belt. It is normally undesirable, of course, for such registration marks to appear on the final prints (on the final image substrate).

The above and further background, including examples of specific MOB registration sensors and controls, is well known to those skilled in this art, and taught in numerous products and patents thereon (of which the following are some examples). Thus, it need not be repeated herein in detail.

For example, the following five Xerox Corp. U.S. patents are noted as specifically mentioning one or more registration systems utilizing "Z" shaped marks, patterns, or targets on a photoreceptor: U.S. Pat. Nos. 5,889,545; 5,815,481; 5,302,973; 5,300,961; and 5,278,625. The following five Xerox Corp. U.S. patents are noted as specifically mentioning one or more registration systems utilizing "chevron" photoreceptor registration marks for color printing: U.S. Pat. Nos. 6,014,154; 5,774,156; 5,537,190; 5,418,556; and (of particular interest) U.S. Pat. No. 5,287,162, entitled "Method and Apparatus for Corrections of Color Registration Errors," issued Feb. 15, 1994 by dejong, et al., describing registration with chevrons and also bi-cell detectors or CCD detectors. The latter and other patents noted above, and other Xerox Corp. patents such as U.S. Pat. Nos. 5,748,221; 5,510,877; and 5,631,686, issued May 20, 1997 to Castelli, et al, are also relevant to MOB sensors and/or systems for image shifting into registration by ROS shifting and/or belt position shifting. Said U.S. Pat. No. 5,748,221, issued Nov. 1, 1995 to Castelli, et al, also describes chevron MOBs and bi-cells sensors. Another MOB registration system for multicolor image registration which is disclosed as specific to intermediate image bearing belts (in addition to U.S. Pat. No. 5,287,162 above) is Fuji Xerox Co. U.S. Pat. No. 6,094,551. Also, U.S. Pat. No. 4,963,899 issued Oct. 16, 1990 to Resch, also describing bi-cell sensors. U.S. Pat. No. 5,909,235 is of particular interest for noting MOB sensor registration, citation of other references here therein, and a background discussion of different applicable color printing systems. Examples of some further, earlier, patents are U.S. Pat. No. 4,903,067 to Murayama et al, especially as to CCD arrays detection of registration marks on belts, and U.S. Pat. No. 4,804,979 on MOBs.

Of additional interest for registration of plural color images with sensed color registration marks on a belt is Xerox Corp. U.S. Pat. No. 5,384,592, issued Jan. 24, 1995 to Lam F. Wong, entitled "Method and Apparatus for Tandem Color Registration Control."

The following copending Xerox Corp. U.S. patent applications on color printer registration systems are also noted: U.S. Ser. No. 09/306,418, filed May 6, 1999, entitled "On-line Image-On-Image Color Registration Control Systems and Methods Based on Time-Scheduled Control Loop Switching" by Michael R. Furst, on a MOB sensor and control system; and U.S. Ser. No. 09/447,231, filed Nov. 23, 1999, entitled "Image Color Registration Sensor Calibration" by Olga Ramirez and Mark Omelchenko, on MOB sensor calibration algorithms, disclosing chevron MOBs; and Ser. No. 09/626,465, filed Jul. 26, 2000 entitled "Color Image Registration Based Upon Belt And Raster Output Scanner Synchronization" by Elias Panides, et al, on registering the leading edges of color images on a photoreceptor belt by ROS synchronization to belt registration holes.

As will be apparent from the above, it is generally well known in the art of reproduction systems that image registration control on an image bearing belt can be done based on MOB sensor measurements of developed marks on the belt indicative of respective image positions on that image bearing member (substrate). As also noted above, that information can be combined with additional sensor information from permanent PR belt marks or holes sensing, and belt edge sensing. As also noted, a printer image registration controller and/or electronic front end (EFE) can utilize MOB sensor inputs and permanent belt registration marks to control ROS scan lines positioning on the photoreceptor (PR) surface to correct registration of the respective image positions on both axes. That is, without necessarily requiring MOB sensor interaction with, or control over, the PR drive or PR steering controls for process direction or lateral direction registration. However, such PR registration movement, instead of, or in addition to, such imaging position registration movement, can also be done if desired.

Color registration systems for printing, as here, should not be confused with various color correction or calibration systems, involving various color space systems, conversions, or values, such as color intensity, density, hue, saturation, luminance, chrominance, or the like, as to which respective colors may be controlled or adjusted. Color registration systems, such as that disclosed herein, relate to positional information and positional correction (shifting respective color images laterally or in the process direction and/or providing image rotation and/or image magnification) so that different colors may be accurately superposed or interposed for customer-acceptable full color or intermixed color or accurately adjacent color printed images. The human eye is particularly sensitive to small printed color misregistrations of one color relative to one another in superposed or closely adjacent images, which can cause highly visible color printing defects such as color bleeds, non-trappings (white spaces between colors), halos, ghost images, etc.

Disclosed in the exemplary embodiment herein is an improved permanent photoreceptor registration marking system providing improved such marking and other advantages.

A specific feature of the specific embodiment disclosed herein is to provide a method of printing on an imageable photoreceptor belt having at least one optical registration mark formed in a defined area of said photoreceptor, with a registration marks sensor for optically detecting said optical registration mark on said photoreceptor belt, wherein said photoreceptor is a plural layer photoreceptor including an internal optically opaque metallic layer, the improvement wherein; forming said optical registration mark by oxidizing said optically opaque metallic layer of said photoreceptor in said defined area of said photoreceptor to render said defined area of said photoreceptor optically transparent for said optical detecting, and detecting said registration mark with said registration marks sensor by detecting illumination through said so-formed optically transparent defined area of said photoreceptor.

Further features disclosed in the embodiment herein, individually or in combination, include a plural color xerographic printing apparatus having a plural layer imageable photoreceptor belt for developing plural color images thereon, said photoreceptor belt having permanent optical registration marks, said plural color printing apparatus also having a photoreceptor registration system for the registration of said photoreceptor belt relative to said plural color images on said photoreceptor belt, said photoreceptor registration system including at least one registration marks sensor for optically detecting the positions of said permanent optical registration marks on said photoreceptor belt, and wherein said photoreceptor belt has an internal optically opaque metallic layer, the improvement wherein; said photoreceptor belt permanent optical registration marks are minor oxidized areas of said internal optically opaque metallic layer which are sufficiently oxidized to form optically transparent areas of said photoreceptor belt which are optically detectable by said registration marks sensor by illumination through said photoreceptor in said optically transparent areas of said photoreceptor; and/or the plural color xerographic printing apparatus with a plural layer imageable photoreceptor belt having permanent optical registration marks, wherein said permanent optical registration marks extend along opposite sides of said photoreceptor; and/or method of manufacturing a plural layer imageable photoreceptor with permanent integral optically detectable registration marks without physical penetration of said photoreceptor, wherein at least one said layer of said photoreceptor comprises an opaque metallic ground plane, comprising oxidizing said opaque metallic ground plane in selected minor areas sufficiently to form transparent areas in said opaque metallic ground plane providing said optically detectable registration marks; and/or wherein said oxidizing of said opaque metallic ground plane in said selected minor areas sufficiently to form said transparent areas in said opaque metallic ground plane providing said optically detectable registration marks is provided by the selective concurrent application of illumination and electrical current to said photoreceptor in said selected minor areas; and/or a method of manufacturing a plural layer imageable photoreceptor belt with permanent integral optically detectable registration marks without physical penetration of said photoreceptor, wherein at least one said layer of said photoreceptor belt comprises a normally opaque metallic layer, comprising oxidizing said opaque metallic layer in selected minor areas along at least one edge area of said belt suitable for said optically detectable registration marks by the selective concurrent application of illumination and electrical current to said photoreceptor in said selected minor areas sufficiently to form transparent areas in said normally opaque metallic layer, to provide said optically detectable registration marks; and/or an article of manufacture made by an above method.

The disclosed system may be operated and controlled by appropriate operation of otherwise conventional control systems in accordance with the descriptions herein. In particular is well known and preferable to program and execute control functions and logic for reproduction systems with software instructions for conventional microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control systems or methods may be implemented partially or fully in hardware, using standard logic circuits or single chip VLSI designs.

The term "reproduction apparatus" or "printer" as alternatively used herein broadly encompasses various printers, copiers or multifunction machines or systems, xerographic or otherwise, unless otherwise indicated or defined in the claims.

As to specific components of the subject apparatus or methods, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the examples below, and the claims. Thus, the present invention will be better understood from this description of these specific embodiment(s), including the drawing figures (which are approximately to scale, unless indicated otherwise) wherein:

FIG. 4 (4A, 4B, 4C, 4D) is an enlarged top view of examples of different possible shapes or configurations of permanently marked transparent areas of the photoreceptor belt of FIGS. 1–3.

Figure 1:
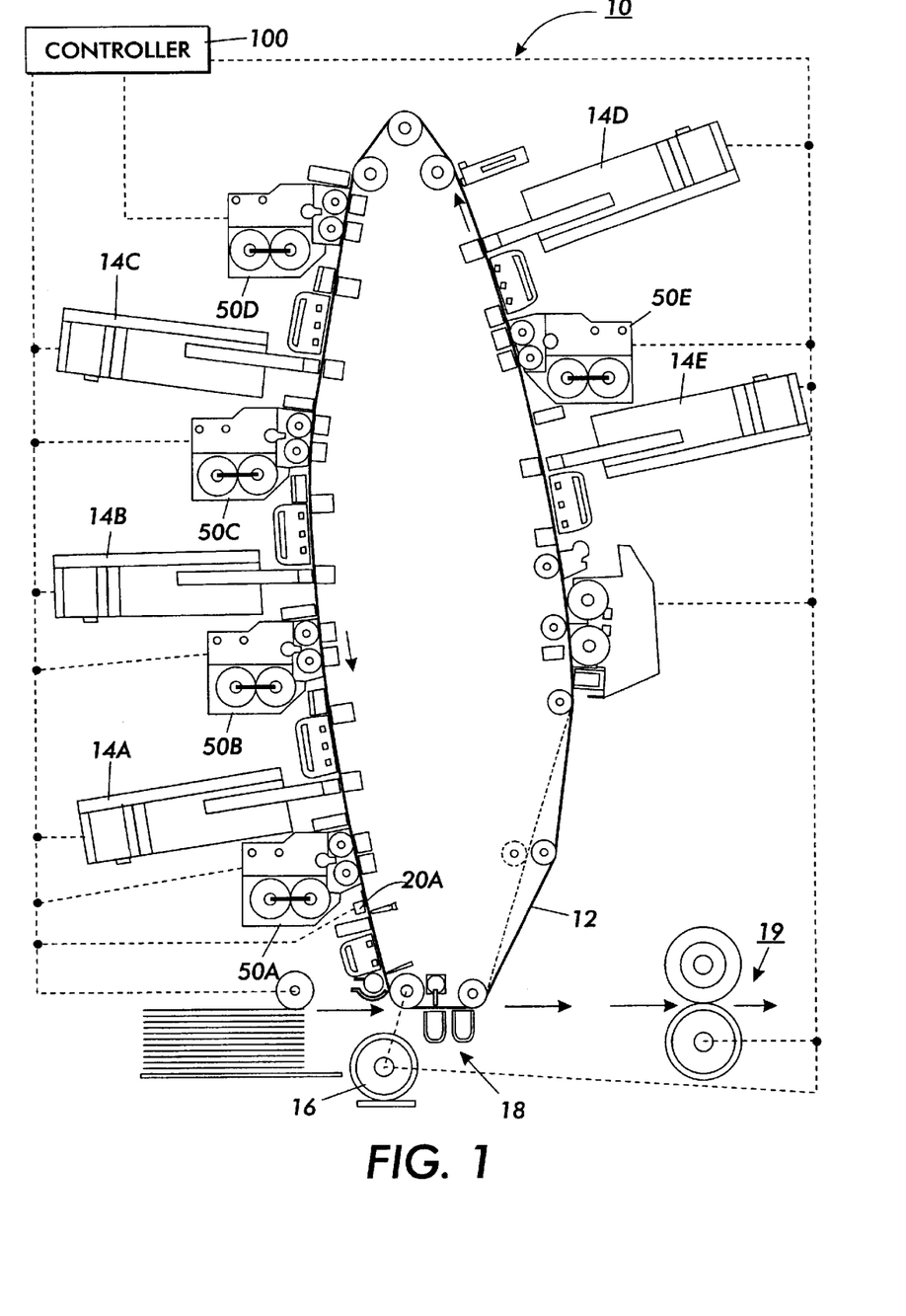
FIG. 1 is a schematic frontal view of one exemplary reproduction system incorporating one example of the subject photoreceptor belt registration marking system, here in a color-on-color xerographic printer.

Describing now in further detail the exemplary embodiment with reference to the Figures, there is schematically shown in FIG. 1 an otherwise known type of xerographic plural color "image-on-image" (IOI) type full color reproduction machine, a printer 10, merely by way of one example of the applicability of the exemplary color registration system. A partial, very simplified, schematic perspective view thereof is provided in FIG. 2. This particular type of printing is also referred as multiple exposure "single pass" color printing. It has plural sequential ROS beam sweep PR image formations and sequential superposed developments of those latent images with primary color toners, interspersed with PR re-charging. Further examples of such IOI system details are described in U.S. Pat. No. 4,660,059; 4,833,503; 4,611,901; etc. However, it will be appreciated that the disclosed improved registration system and method could also be employed in "tandem" xerographic or other color printing systems, typically having plural print engines transferring respective colors sequentially to an intermediate image transfer belt and then to the final substrate. Various known types of color printers are further described in the above-cited patents and need not be further discussed herein.

Figure 2:
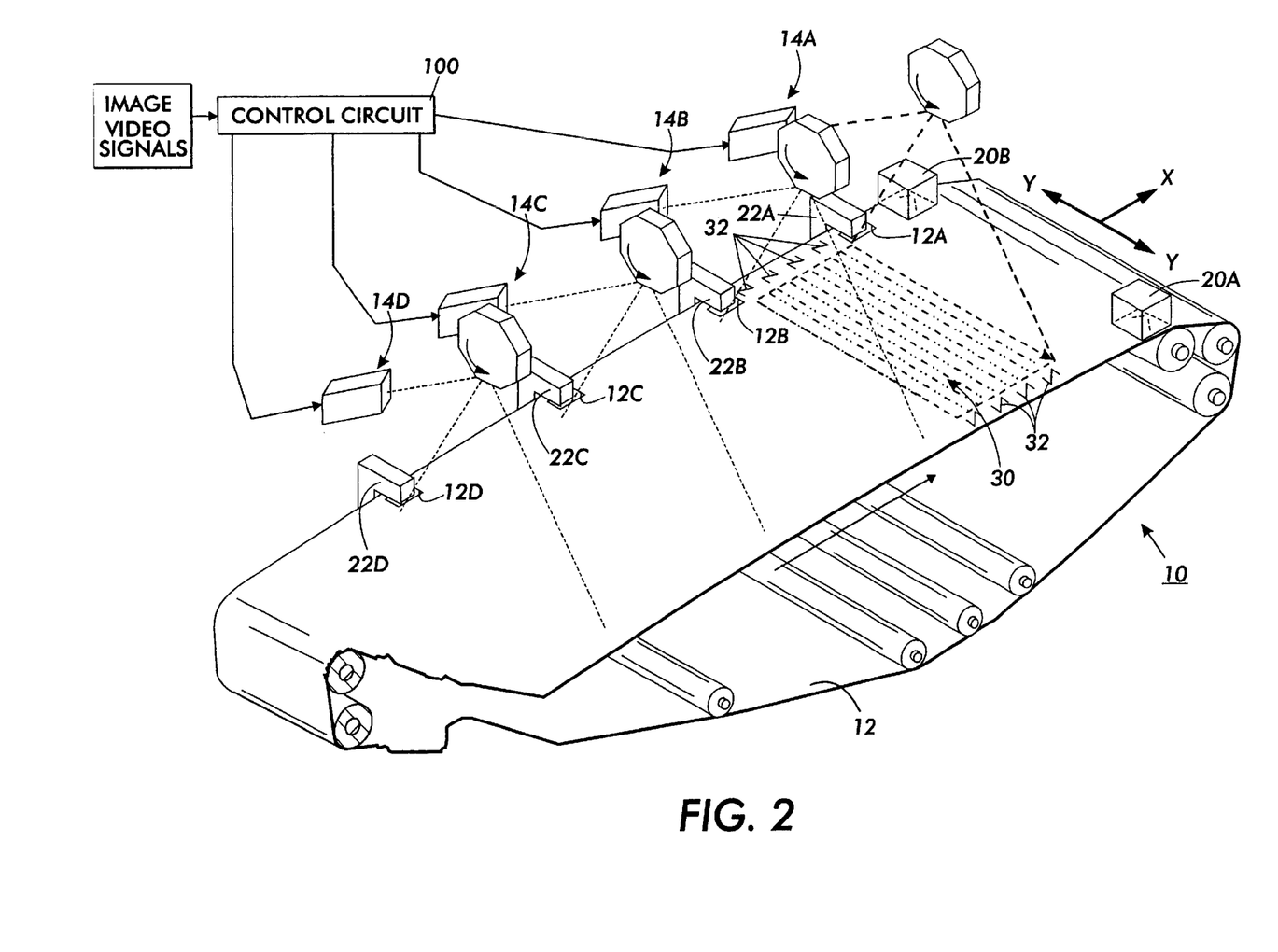
FIG. 2 is a simplified schematic perspective view of part of the embodiment of FIG. 1 for better illustrating exemplary sequential ROS generation of plural color latent images and temporary MOB's, in combination with exemplary subject transparent belt area permanent registration marks and conventional optical sensors therefor (with other components removed for illustrative clarity)

Referring to the exemplary printer 10 of FIGS. 1 and 2, all of its operations and functions may be controlled by programmed microprocessors as described above, at centralized, distributed, and/or remove system server locations, any of which schematically illustrated here by the controller 100. A single photoreceptor belt 12 may be successively charged, ROS imaged, and developed with black and/or any or all primary colors toners by a plurality of imaging stations. In this example, these imaging stations include respective ROS's 14A, 14B, 14C, 14D, and 14C; and associated developer units 50A, 50B, 50C, 50D, and 50C. Two MOB sensors 20A and 20B are schematically illustrated and will be further described herein. The belt 12 has a conventional drive system 16 for moving it in the process direction shown by its movement arrows. A conventional transfer station 18 is illustrated for the transfer of the composite color images to the final substrate, usually a paper sheet, which then is fed to a fuser 19 and outputted. The belt 12 may be an otherwise known or conventional organic photoreceptor belt, on which there is extensive patent and other literature, or other materials, and need not be described in detail herein. E.g., noted above was Xerox Corp. U.S. Pat. No. 4,780,385 issued to Fran Weiloch et al.

Referring to FIG. 2, it may be seen that small fiducial or registration transparent areas 12A, 12B, 12C, 12D, etc., (of various possible configurations, as shown in FIG. 4) are provided along one (or both) edges of the photoreceptor belt 12. These transparent window registration marks in the belt may be readily optically detected by conventional prior known belt hole sensors (or other optical sensors) such as are schematically shown in FIG. 2 as 22A, 22B, 22C, 22D. Various possible functions of sensed photoreceptor belt hole are described, for example, above and in various above-cited patents. If desired, these permanent belt registration markings may be located, as shown, adjacent respective image areas, but it is not necessary that there be such a mark for each image position, or that there be plural sensors. Also, the number, size and spacing of the image areas along the photoreceptor belt may vary. For example, changing for larger or smaller images in the process direction for printing on larger or smaller sheets of paper.

Disclosed in the embodiment herein is an improved, simple, method of permanent photoreceptor marking by image-wise ground plane oxidation. That is, using the phenomenon of ground plane oxidation to create internal selected images of desired fiducial markings which are transparent. Thus, they can provide the registration functions of belt holes without requiring belt holes. For example, labeling, timing, and/or other registering of images on photoreceptor belts, and/or belt seam skipping.

In this example we permanently mark the photoreceptor belt 12 by making the otherwise opaque ground plane 12G of the photoreceptor belt (usually a metalized plastic) more transparent in an image-wise manner, thus creating any desired number and location of permanent fiducial (registration) markings such as 12A, 12B, 12C, 12D in the belt. These registration marks are not on the belt surface, and are not subject to being worn off in use. This can be done before or after the coated photoreceptor material web is cut and seamed into a photoreceptor belt.

"Opaque" as used above and otherwise in this application is broadly defined. For example, encompassing a layer that reflects greater than 50% (preferably greater than 80%) of the visible light (including near infrared and near UV) impinging on it.

Figure 3:
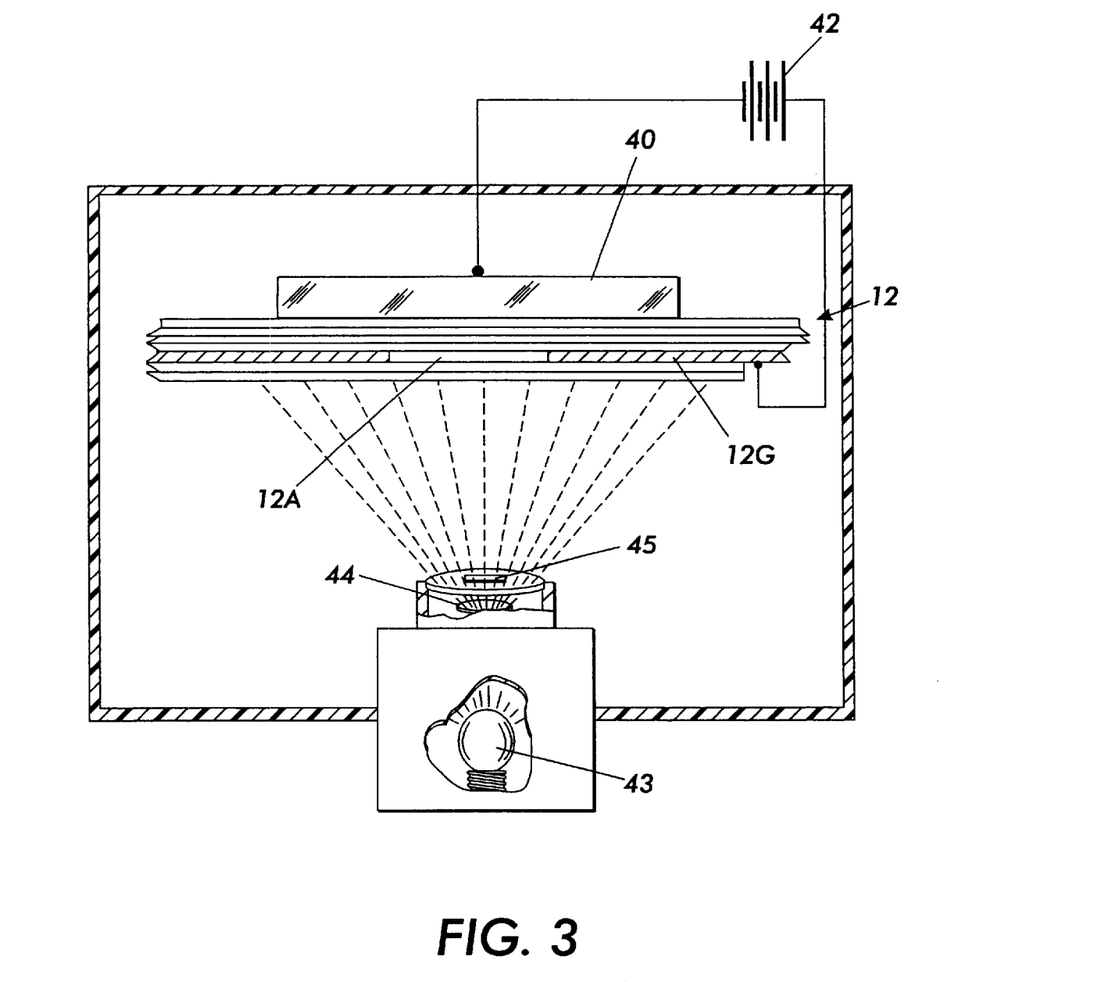
FIG. 3 is one example of an implementation of the subject process for forming permanent transparent area registration marks in a photoreceptor belt such as that of FIGS. 1 and 2.
Figure 4A:
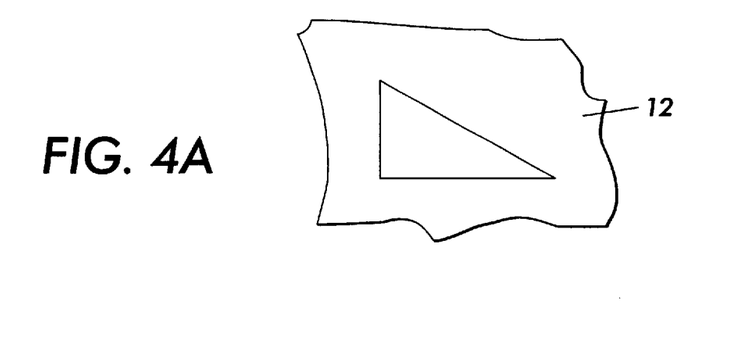
Figure 4B:
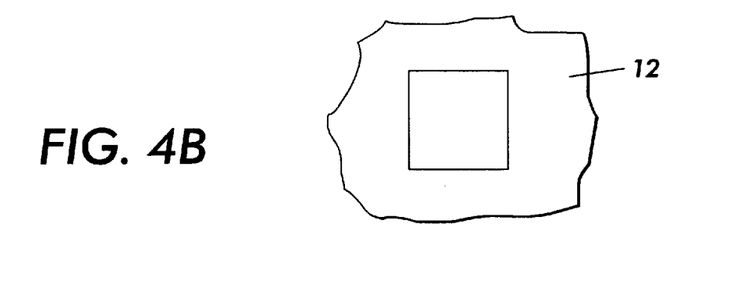
Figure 4C:
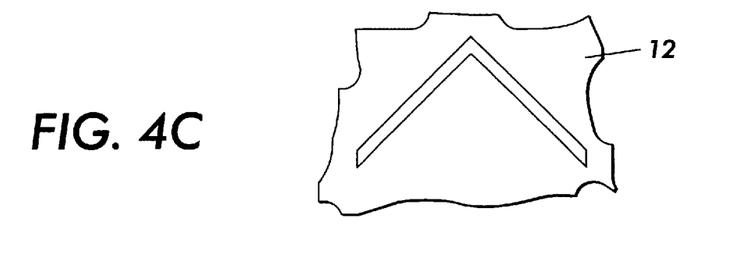
Figure 4D:
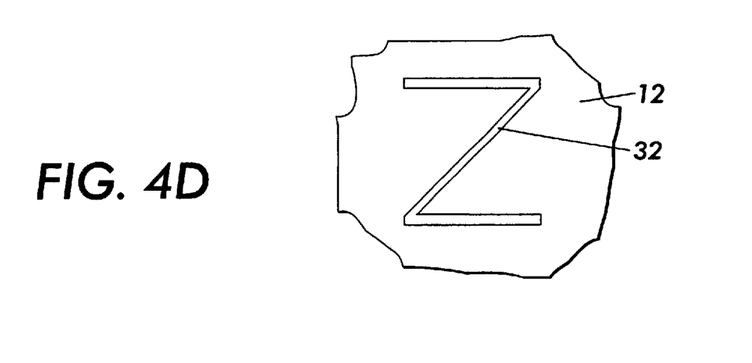

As shown in FIG. 3, an image may created in the ground plane 12G by placing a uniform semi-transparent charging system, such as an indium tin oxide plate 40 connected to a suitable voltage source such as 42 or other charging device near or in contact with the top surface of the photoreceptor 12, while the photoreceptor is held in the dark (not light exposed). The photoreceptor 12 will accept some nominal level of charge flow if such a device is voltage-limited.

An image of the desired fiducial mark (such as shown in FIG. 4) may be imposed on the front or rear surface of the photoreceptor at the location that one wants the fiducial. As shown in the example FIG. 3, it may be projected on the rear surface of the photoreceptor by a simple projection lamp 43 and lens 44 through a correspondingly apertured light mask 45, or with laser scans, or numerous other possible area controlled illumination systems. It may alternatively be imaged on the front side of the photoreceptor through transparent conductive areas in the charging plate 40. The illustrative illuminated area here is 12A, of FIG. 2. Current flows through the photoreceptor 12 from the ground plane 12G to the charging system 40, 42 only in the selected illuminated areas, and therefore sufficient current will image-wise oxidize the ground plane 12 in those selected areas here), creating the desired permanent internal transparent fiducial area therein—12A in this example. Further details and examples are provided below.

By way of further background, referring to said U.S. Pat. No. 4,780,385 granted to Fran Wilock et al, we see that placing zirconium in the base layer helps prevent an image defect called CDS or charge deficient spots, but allows a change in transmission of the ground plane as charge erase cycles are run on the belt.

While this increase in transmission, due to the oxidation of the zirconium in the ground plane, normally occurs much later than the intrinsic mechanical life of the current belt plastic substrates, it is still a concern in programs which use multiple charge erase cycles in each image and desire a very long belt life. For instance, a desired mechanical belt life can be 100K belt cycles, but with up to four charge and erase events per cycle, the photoreceptor ground plane has been discovered by the inventors to oxidize locally dependent on the usage history of the belt. This deleterious problem discovery is utilized in a constructive manner herein.

The above-disclosed method has various possible configurations, as noted. In an example, HoGaPc photoreceptors as utilized in the Xerox DT180™ product have been used as a test vehicle. However, it is believe that any "AMAT" type photoreceptor belt should be easily handled. In the example of FIG. 3, for frontal imaging, an ITO glass plate 40 was connected to the negative voltage output of a conventional power supply 42 then placed in contact with the photoreceptor CTL (charge transport layer). The ground strip 12G was grounded to the power supply 42. An image mask 45 was created with xerography transparencies. Fluorescent lights and 25 and 52 watt incandescent bulbs were used individually as light sources 43 to successfully create permanent images on separate PR ground planes, with "contact printing", not even requiring a lens such as 44. Power supply 42 voltages from 250V to 1000V were successfully tried on the ITO 40.

Images have also been made in the same configuration by imaging the PR through the ground plane 12G with the same image placed in direct contact with the ACBC layer. This was also successful. Finally, a full sheet of aluminum foil was placed in contact with the CTL (charge transfer layer), flattened, and held at 450V while the image was illuminated with 25 watts from the rear, to produce a full page size permanent image. It can be seen in the levels of transparency created in the ground plane in this case, as in the earlier cases, that some light, probably IR, that this particular photoreceptor is sensitive to, was transmitted through the clear transparency in the final ground plane image.

Another variant of this method would be placing a small conductive ITO shape at high voltage in direct contact with the photoconductive layer at the edge of a belt just next to (closely adjacent to) the ground strip, which in this case would be connected to the ground contact of the high voltage supply. This contact, together with moderate flooding light, would image the same size shape as the ITO contact in the area adjacent to the ground plane, that is, leave a belt-hole-like small fiducial transparent area adjacent to the ground plane, the size of, and at the position of, the contacting ITO surface.

With the disclosed method, it may be seen that tracking fiducial marks can be easily imaged into the ground plane of the belt without affecting conductivity, and moreover, without physically damaging the belt in any way. To summarize this simple manufacturing process, the photoreceptor is preferably an otherwise conventional plural layer organic photoreceptor web with an internal optically opaque metallic ground plane layer, and the transparent optical registration marks are formed by oxidizing defined areas thereof. This may be accomplished by the simultaneous selective application of illumination to the selected minor area of the photoreceptor plus the application of electrical current from a voltage source applied across that area while the adjacent areas of the photoreceptor are not illuminated.

It will be noted that, depending on the particular photoreceptor, that the ground plane being made transparent in imaged areas here will not be the bottom layer of the belt, and is actually internally of the belt, which may be desirable. A typical AMAT type photoreceptor, as is well known to those in the art, has approximately seven layers. Typically, the bottom-most layer is an anti-curl backing layer, and the next-to-the-bottom layer is a substrate layer (such as Mylar™), then followed by the ground plane layer, which is typically a vacuum deposited metallic layer. Above that layer is typically a charge blocking layer, then (optionally) an adhesive or interference layer, then a charge generating layer, then (optionally) an overcoating layer.

It will be appreciated as to the embodiment description of rendering defined areas of the optical registration marks of the photoreceptor optically transparent, that the present system is not limited to transparency in the narrow sense of human visibility. By transparency in the sense used herein there is also encompassed any translucency such that an IR beam or other light source can be detected through that area of the belt, even if diffused and/or absorbed somewhat.

As noted, one function or utilization of belt marks and sensors may be to detect the position of a seam in the PR belt, previously done with belt registration or belt seam location apertures (belt timing holes). The present system can replace such holes and their functions, yet utilize the same sensors if desired.

As noted, the present system may be combined with other color registration systems producing temporary imaged and toner-developed registration marks on the photoreceptor relating to registering the position of images being generated thereon relative to one another and/or the photoreceptor surface, which toner marks are detected by MOB sensors such as 20 to provide positional information therefrom. This is particularly valuable for color images where critically accurate superposition of different colors is required. However, the disclosed method of manufacturing a photoreceptor or using it in a xerographic printer is not limited to color printers.

As noted above, and taught in the cited references, permanent registration marks in the belt (such as are provided herein by transparent areas), may be operationally combined for enhanced registration with ROS imaged and toner developed temporary marks on the belt (MOB) corresponding to image positions. For example, the "Z" marks 32 shown in FIG. 2 adjacent one image area 30, which temporary marks 32 on the belt surface are positionally read as they pass under the MOB sensors 20A and 20B with movement of the belt, then erased by the printer's cleaning system.

The imposed registration marks are, of course, desirably outside of the maximum image area. Where the printer is one with its images and paper path registered to one side, as is typical (rather than center registered) the registration marks may be towards and along the other or outside edge of the PR belt. However, as shown herein, preferably even for such an edge-registered printer system, for maximum skew registration sensitivity and accuracy, registration marks, and the sensors for reading them, may be positioned spaced apart on opposite sides of the belt, on opposite sides of the image area.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a method of printing on an imageable photoreceptor belt having at least one optical registration mark formed in a defined area of said photoreceptor, with a registration marks sensor for optically detecting said optical registration mark on said photoreceptor belt, wherein said photoreceptor is a plural layer photoreceptor including an internal optically opaque metallic layer, the improvement wherein;

forming said optical registration mark by oxidizing said optically opaque metallic layer of said photoreceptor in said defined area of said photoreceptor to render said defined area of said photoreceptor optically transparent for said optical detecting, and detecting said registration mark with said registration marks sensor by detecting illumination through said so-formed optically transparent defined area of said photoreceptor.

2. In a plural color xerographic printing apparatus having a plural layer imageable photoreceptor belt for developing plural color images thereon, said photoreceptor belt having permanent optical registration marks, said plural color printing apparatus also having a photoreceptor registration system for the registration of said photoreceptor belt relative to said plural color images on said photoreceptor belt, said photoreceptor registration system including at least one registration marks sensor for optically detecting the positions of said permanent optical registration marks on said photoreceptor belt, and wherein said photoreceptor belt has an internal optically opaque metallic layer, the improvement wherein;

said photoreceptor belt permanent optical registration marks are minor oxidized areas of said internal optically opaque metallic layer which are sufficiently oxidized to form optically transparent areas of said photoreceptor belt which are optically detectable by said registration marks sensor by illumination through said photoreceptor in said optically transparent areas of said photoreceptor.

3. The plural color xerographic printing apparatus with a plural layer imageable photoreceptor belt having permanent optical registration marks of claim 2, wherein said permanent optical registration marks extend along opposite sides of said photoreceptor.

4. A method of manufacturing a plural layer imageable photoreceptor with permanent integral optically detectable registration marks without physical penetration of said photoreceptor, wherein at least one said layer of said photoreceptor comprises an opaque metallic ground plane, comprising oxidizing said opaque metallic ground plane in selected minor areas sufficiently to form transparent areas in said opaque metallic ground plane providing said optically detectable registration marks.

5. An article of manufacture made by the method of claim 4.

6. A method of manufacturing a plural layer imageable photoreceptor with permanent integral optically detectable registration marks without physical penetration of said photoreceptor, wherein at least one said layer of said photoreceptor comprises an opaque metallic ground plane, comprising oxidizing said opaque metallic ground plane in selected minor areas sufficiently to form transparent areas in said opaque metallic ground plane providing said optically detectable registration marks, wherein said oxidizing of said opaque metallic ground plane in said selected minor areas sufficiently to form said transparent areas in said opaque metallic ground plane providing said optically detectable registration marks is provided by the selective concurrent application of illumination and electrical current to said photoreceptor in said selected minor areas.

7. A method of manufacturing a plural layer imageable photoreceptor belt with permanent integral optically detectable registration marks without physical penetration of said photoreceptor, wherein at least one said layer of said photoreceptor belt comprises a normally opaque metallic layer, comprising oxidizing said opaque metallic layer in selected minor areas along at least one edge area of said belt suitable for said optically detectable registration marks by the selective concurrent application of illumination and electrical current to said photoreceptor in said selected minor areas sufficiently to form transparent areas in said normally opaque metallic layer, to provide said optically detectable registration marks.

8. An article of manufacture made by the method of claim 7.

* * * * *